United States Patent
Henry et al.

(10) Patent No.: US 7,310,498 B2
(45) Date of Patent: Dec. 18, 2007

(54) COMMUNICATION PROTOCOL FOR PERSONAL COMPUTER SYSTEM HUMAN INTERFACE DEVICES OVER A LOW BANDWIDTH, BI-DIRECTIONAL RADIO FREQUENCY LINK

(75) Inventors: Trenton B. Henry, Austin, TX (US); Klaas Wortel, Phoenix, AZ (US); Guy A. Stewart, Leander, TX (US); Henry Wurzburg, Austin, TX (US); James R. MacDonald, Buda, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 611 days.

(21) Appl. No.: 10/410,088

(22) Filed: Apr. 9, 2003

(65) Prior Publication Data

US 2004/0203388 A1    Oct. 14, 2004

(51) Int. Cl.
*H04B 7/00*    (2006.01)
(52) U.S. Cl. .................... 455/41.2; 455/41.1; 455/509; 455/516
(58) Field of Classification Search ............... 455/41.1, 455/41.2, 509, 516; 345/168, 169
See application file for complete search history.

(56) References Cited

U.S. PATENT DOCUMENTS

| | | |
|---|---|---|
| 4,456,972 A | 6/1984 | Lee et al. |
| 5,146,567 A | 9/1992 | Kao |
| 5,150,401 A | 9/1992 | Ashby, III et al. |
| 5,249,232 A | 9/1993 | Erbes et al. |
| 5,533,015 A | 7/1996 | Makowski et al. |
| 5,708,458 A | 1/1998 | Vrbanac |
| 5,790,889 A | 8/1998 | Witte |
| 5,793,359 A | 8/1998 | Ushikubo |
| 5,881,366 A | 3/1999 | Bodenmann et al. |
| 5,890,015 A | 3/1999 | Garney et al. |
| 5,920,308 A | 7/1999 | Kim |
| 5,923,757 A | 7/1999 | Hocker et al. |
| 5,949,882 A | 9/1999 | Angelo |
| 5,958,023 A * | 9/1999 | Klein .......................... 710/18 |

(Continued)

OTHER PUBLICATIONS www.wireless-computing.com, Wireless Keyboard RF-250, 6 pages, Jun. 12, 2002.

(Continued)

*Primary Examiner*—Sanh D. Phu
(74) *Attorney, Agent, or Firm*—Meyertons Hood Kivlin Kowert & Goetzel, P.C.; Jeffrey C. Hood; Russell E. Henrichs

(57) ABSTRACT

A system and method for maintaining communications with a radio frequency (RF) peripheral device such as an RF input device and an RF output device. A computer may search for an RF peripheral device by transmitting a signal request on available channels until a response is received from an RF peripheral device. If the RF channel becomes busy and/or jammed, the RF peripheral device may tune into a predetermined channel while the computer scans for another channel to use. Once the computer finds a better channel, the computer may go to the predetermined channel and broadcast the new channel location to the RF peripheral device. In addition, if an RF signal arrives incomplete or corrupt, the computer may transmit a negative acknowledgement to the RF peripheral device, which may retransmit the previous RF signal.

25 Claims, 6 Drawing Sheets

U.S. PATENT DOCUMENTS

| | | | |
|---|---|---|---|
| 6,026,288 A | 2/2000 | Bronner | |
| 6,028,538 A | 2/2000 | Ramesh et al. | |
| 6,052,116 A | 4/2000 | Takagi | |
| 6,212,635 B1 | 4/2001 | Reardon | |
| 6,243,079 B1 | 6/2001 | Liu | |
| 6,356,780 B1 | 3/2002 | Licato et al. | |
| 6,401,198 B1 | 6/2002 | Harmer et al. | |
| 6,466,787 B1 | 10/2002 | Cannon et al. | |
| 6,466,789 B1* | 10/2002 | Bruhn et al. | 455/436 |
| 6,587,739 B1 | 7/2003 | Abrams et al. | |
| 6,597,739 B1* | 7/2003 | Li et al. | 375/240.19 |
| 6,600,928 B1 | 7/2003 | Ahya et al. | |
| 6,678,750 B2 | 1/2004 | Meade, II et al. | |
| 6,693,626 B1 | 2/2004 | Rosenberg | |
| 6,694,430 B1 | 2/2004 | Zegelin et al. | |
| 6,703,550 B2 | 3/2004 | Chu | |
| 6,725,302 B1 | 4/2004 | Benayoun et al. | |
| 6,735,448 B1 | 5/2004 | Krishnamurthy et al. | |
| 6,742,052 B2 | 5/2004 | Himmel et al. | |
| 6,745,047 B1 | 6/2004 | Karstens et al. | |
| 6,763,483 B2* | 7/2004 | Penick et al. | 714/39 |
| 6,781,570 B1 | 8/2004 | Arrigo et al. | |
| 6,832,093 B1* | 12/2004 | Ranta | 455/456.4 |
| 6,934,520 B2 | 8/2005 | Rozsypal | |
| 6,961,048 B2 | 11/2005 | Mitchell | |
| 7,024,501 B1 | 4/2006 | Wright | |
| 7,027,768 B2 | 4/2006 | Hill | |
| 7,028,114 B1 | 4/2006 | Milan et al. | |
| 7,042,897 B1* | 5/2006 | Sivaprakasam et al. | 370/462 |
| 7,055,047 B2 | 5/2006 | Wortel et al. | |
| 2001/0003191 A1* | 6/2001 | Kovacs et al. | 709/226 |
| 2002/0126010 A1 | 9/2002 | Trimble et al. | |
| 2002/0159434 A1* | 10/2002 | Gosior et al. | 370/350 |
| 2003/0033452 A1* | 2/2003 | Himmel et al. | 710/9 |
| 2004/0028011 A1 | 2/2004 | Gehring et al. | |
| 2004/0036632 A1 | 2/2004 | Ford | |
| 2004/0203388 A1 | 10/2004 | Henry et al. | |
| 2004/0203480 A1 | 10/2004 | Dutton et al. | |
| 2004/0203962 A1 | 10/2004 | Dutton et al. | |
| 2004/0205361 A1 | 10/2004 | Wortel et al. | |

OTHER PUBLICATIONS http://h18066.www1.hp.com/products/quickspecs/11488_na/11488_na.HTML, 3 sheets, date unknown.

http://web.archive.org/web/2003020513340/http://www.apinex.com/ret2/wkb 1an.html; "IR Cordless Keyboard with integrated pointing device"; date unknown; 2 pages.

Marshall Brain and Jeff Tyson; "How Cell Phones Work" from verizon website http://www.22.verizon.com/about/community/learningcenter/articles/display article1/0,,1008zl,00.html; 2 pages.

Prior Art Statement; 2 pages.

* cited by examiner

COMMUNICATION PROTOCOL FOR PERSONAL COMPUTER SYSTEM HUMAN INTERFACE DEVICES OVER A LOW BANDWIDTH, BI-DIRECTIONAL RADIO FREQUENCY LINK

BACKGROUND OF THE INVENTION

1. Field of the Invention

The present invention relates generally to managing peripheral device usage for a computer system and specifically to maintaining reliable communication between a computer system and peripheral devices.

2. Description of the Related Art

Computer systems may use many different types of peripheral devices. For example, computer systems may receive input from user input devices such as, but not limited to, a pointing device, such as a computer mouse, a keyboard, a microphone, a camera, and a joystick. Because managing wires from different user input devices may be cumbersome, the computer system may use wireless, e.g., radio frequency (RF), signals to communicate with the user input device. For example, an RF peripheral device may transmit an RF signal to a computer system to provide the computer system with a user's inputs (e.g., mouse movements, keyboard keys pressed, etc.). The RF peripheral device may also receive RF signals from the computer system.

While using the RF signals may allow peripheral devices to communicate with the computer system without requiring wires, RF signals may have disadvantages. For example, computer systems may have trouble detecting or establishing a connection with new RF peripheral devices. RF channels used to transmit RF signals may become busy and/or jammed. In addition, RF signals may be lost, may be incomplete, or may be corrupt when received by the computer system. As a result, computer system programs may be disrupted because of incomplete or missing user inputs. Current computer system software may not be programmed to adjust to intermittent signals from an RF peripheral device, and therefore may require consistent input despite an intermittent RF environment.

SUMMARY OF THE INVENTION

In one embodiment, a computer may comprise or be coupled to a first radio frequency transmitter/receiver (RFTR). The first RFTR may communicate with a second RFTR coupled to an RF peripheral device. In one embodiment, the first RFTR may establish communications with the second RETR using a discovery process and, if needed, reestablish communications with the second RFTR using a reunion process.

In one embodiment of the discovery process, the first RFTR may transmit a request for all unassociated RF peripheral devices to respond over a first channel. A microcontroller coupled to the first RFTR may determine if a response from the second RFTR is received over the first channel. If the response from the second RFTR is not received, the first RFTR may transmit the request for all unassociated RF peripheral devices to respond over a second channel and then resume determining if a response is received from the second RFTR over the second channel. In one embodiment, the second RFTR may also tune into one channel after another until a connection is established with the first RFTR.

If the first RFTR receives a response from the second RFTR, a wireless connection may be established between the first RFTR and the second RFTR. In one embodiment, if the second RFTR responds, a computer may form an association with the RF peripheral devices coupled to the second RFTR, assign the RF peripheral device an address, and enumerate the capabilities of the RF peripheral device.

Communications between the first RFTR and the second RFTR may be interrupted. In one embodiment, the microcontroller coupled to the computer may determine if an expected data packet (i.e., in a communication from the second RFTR) is not received, an incomplete data packet is received, or a corrupt data packet is received from the second RFTR. The first RFTR may then transmit a negative acknowledgment (NAK) to the second RFTR to indicate that the second RFTR needs to resend the last data packet. In one embodiment, the first RFTR may transmit a request to the second RFTR to have the RF peripheral device resend the last data packet. The second RFTR may then resend the last data packet to the first RFTR.

In one embodiment of the reunion process, if the current channel being used by the first RFTR and the second RFTR becomes jammed for an extended period of time and communications need to be reestablished, the second RFTR may go to a pre-determined channel and wait for instructions or for a third channel location from the first RFTR. In one embodiment, the second RFTR may have the pre-determined channel location in memory to tune into in case communications with the first RFTR is discontinued on a current channel. In another embodiment, the first RFTR may transmit a channel to the second RFTR to tune into to wait for further instructions.

In one embodiment, the first RFTR may continue to tune into different channels until a usable channel (e.g., a clear and relatively inactive channel) is found. In one embodiment, when the first RFTR finds a usable channel, the first RFTR may return to the pre-determined channel and transmit the third channel location (i.e., the usable channel location) to the second RFTR. In one embodiment, the first RFTR may not be able to find a clear channel. Instead, the first RFTR may have to determine the best channel available. In one embodiment, the first RFTR may pick a channel that is clearer/more inactive than the previous channel the first RFTR was using.

In one embodiment, the first RFTR may tune into the third channel after transmitting the third channel location to the second RFTR. The first RFTR may transmit a request for the second RFTR to respond over the third channel. Communications may be established with the second RFTR over the third channel once the second RFTR response has been received over the third channel. In one embodiment, communications may be reestablished with the second RFTR without requesting that the second RFTR respond on the third channel. For example, the first RFTR may assume that the second RFTR tuned into the third channel until the first RFTR gets an indication that the second RFTR has not tuned into the third channel (e.g., a lack of response from the second RFTR).

BRIEF DESCRIPTION OF THE DRAWINGS

A better understanding of the present invention may be obtained when the following detailed description is considered in conjunction with the following drawings, in which.

Figure 1:
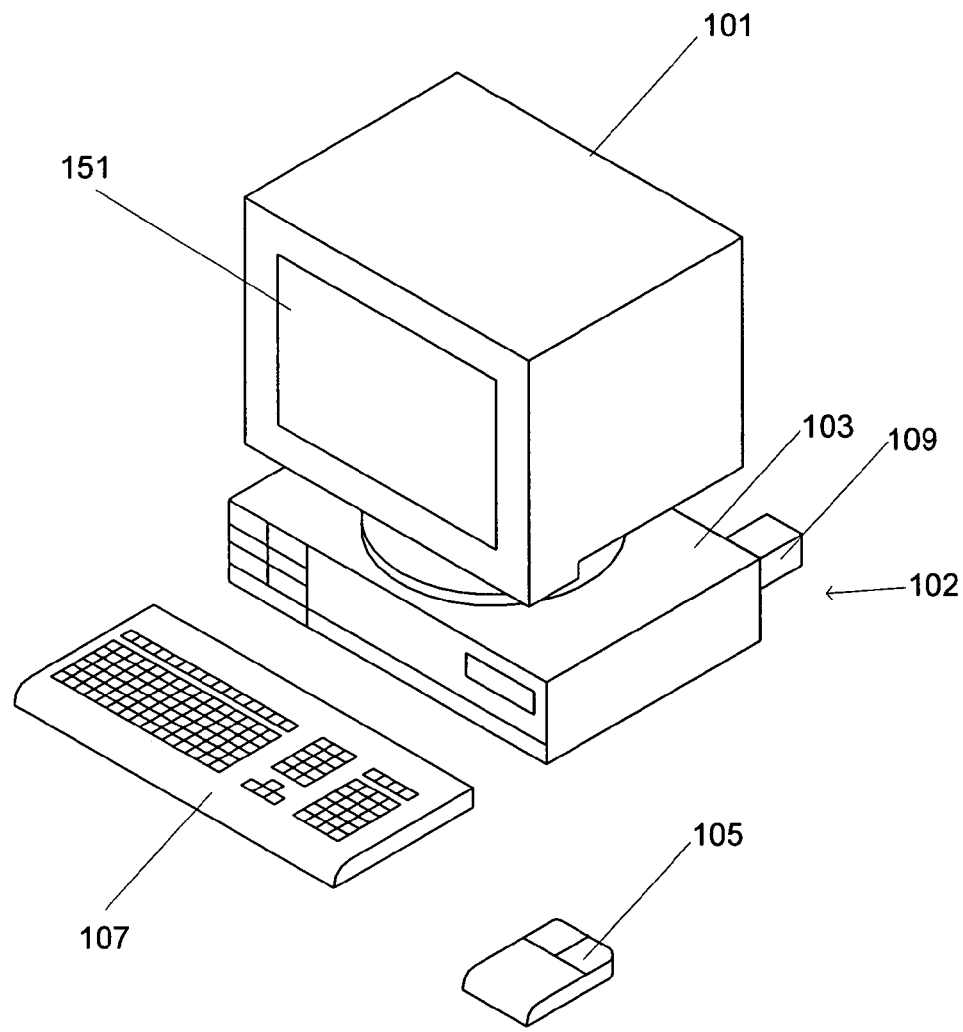
FIG. 1 illustrates a computer system with an RF peripheral device, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 illustrates an embodiment of a computer system with a computer and an RF peripheral device. In various embodiments, the RF peripheral device may include a wireless input device such as, but not limited to, an RF pointing device, such as an RF computer mouse 105, an RF keyboard 107, an RF camera 159, an RF joystick 155, an RF gamepad 153, an RF touchscreen 151 or an RF microphone 157. Embodiments of the RF peripheral devices described herein may also be used with wireless output devices, such as an RF speaker, an RF display 101, and an RF printer. Other RF peripheral devices are also contemplated. In one embodiment, a computer 102 may have a processor/memory housing 103. In one embodiment, the computer 102 may communicate with the RF peripheral device through a peripheral base station 109 coupled to the processor/memory housing 103.

In one embodiment, RF signals may be transmitted between the computer 102 and the RF peripheral devices communicably coupled to the computer 102. For example, RF computer mouse movements may be transmitted to the computer 102 to control a cursor and keystrokes may be transmitted from the RF keyboard 107 to the computer 102 to provide user typed characters. Other input is also contemplated. As another example, output may be transmitted to the RF display 101 to display an image on the RF display 101. In one embodiment, the computer 102 may communicate with multiple RF peripheral devices on one channel. For example, adjacent computers may each use a separate channel to communicate with the respective computer's RF peripheral devices. Other channel usage is also contemplated. In one embodiment, the RF peripheral device may communicate with the computer 102 through a bit stream relayed half-duplex communication using a frequency shift keying (FSK) RF link. Other communication forms are also contemplated.

Figure 2:
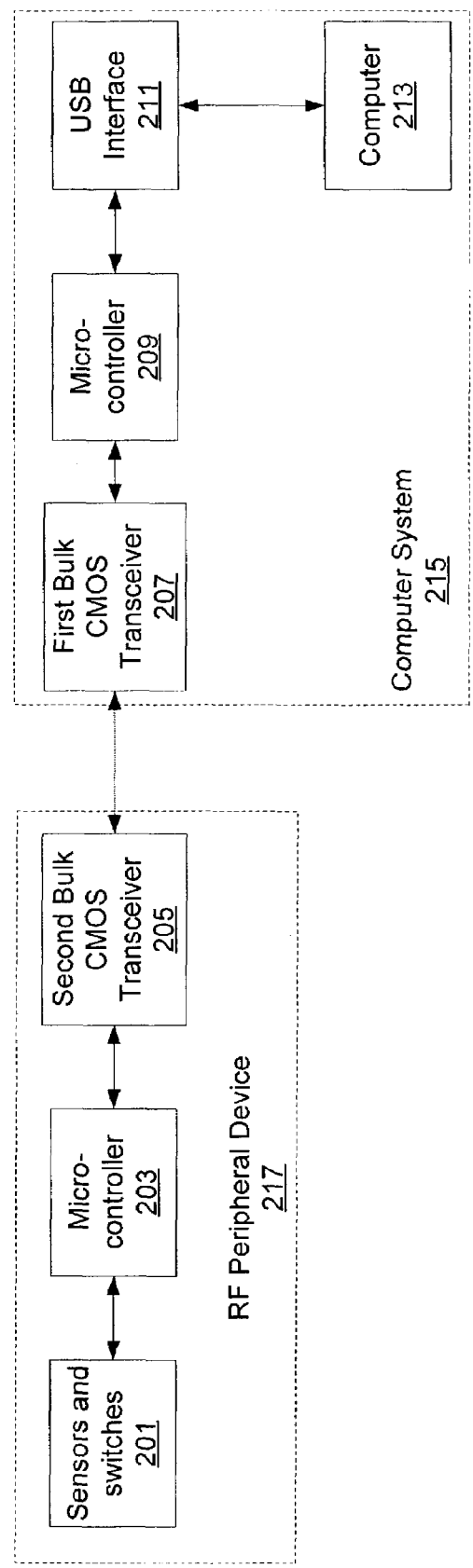
FIG. 2 illustrates a block diagram of a computer and an RF peripheral device, according to one embodiment.

FIG. 2: Block Diagram of a Computer System and an RF Peripheral Device

FIG. 2 illustrates a block diagram of an embodiment of a computer system with an RF peripheral device. The computer system 215 may comprise a computer 213 coupled to a micro-controller 209 through a universal serial bus (USB) interface 211. In one embodiment, the micro-controller 209 may have a micro-processor and a first memory with instructions executable by the micro-processor. In one embodiment, a processor, such as a central processing unit (CPU), and the first memory, such as, but not limited to, a random access memory (RAM) or hard disk memory, may be used in place of the micro-controller 209. Other processors and other memories are also contemplated. The first memory may have instructions executable by the micro-processor to control a first radio frequency transmitter/receiver (RFTR) such as, but not limited to, a first bulk complementary metal oxide semiconductor (CMOS) transceiver 207. In one embodiment, the first RFTR and the micro-controller 209 may be located in the peripheral base station 109 (see FIG. 1) coupled to the computer 213 and use modulation and demodulation of RF signals for communication. In one embodiment, the first RFTR and the micro-controller 209 may be located in the processor/memory housing 103.

In one embodiment, the RF peripheral device 217 may have a second RFTR such as, but not limited to, a bulk CMOS transceiver 205 for receiving and transmitting configuration information to the first bulk CMOS transceiver 207 coupled to the computer 213. The second RFTR may be coupled to a micro-controller 203. In one embodiment, the micro-controller 203 may have a micro-processor and a second memory with instructions executable by the microprocessor. The RF peripheral device 217 may use various sensors and switches 201 to gather information from the user for transmitting to the computer 213. For example, an RF computer mouse may have an X direction sensor and a Y direction sensor for detecting user input movement. Other sensors and switches are also contemplated. In addition, while the block diagram shows an embodiment with sensors and switches 201, other sources for inputs and outputs are also contemplated. For example, the computer 213 may send output information to an RF speaker.

Figure 3:
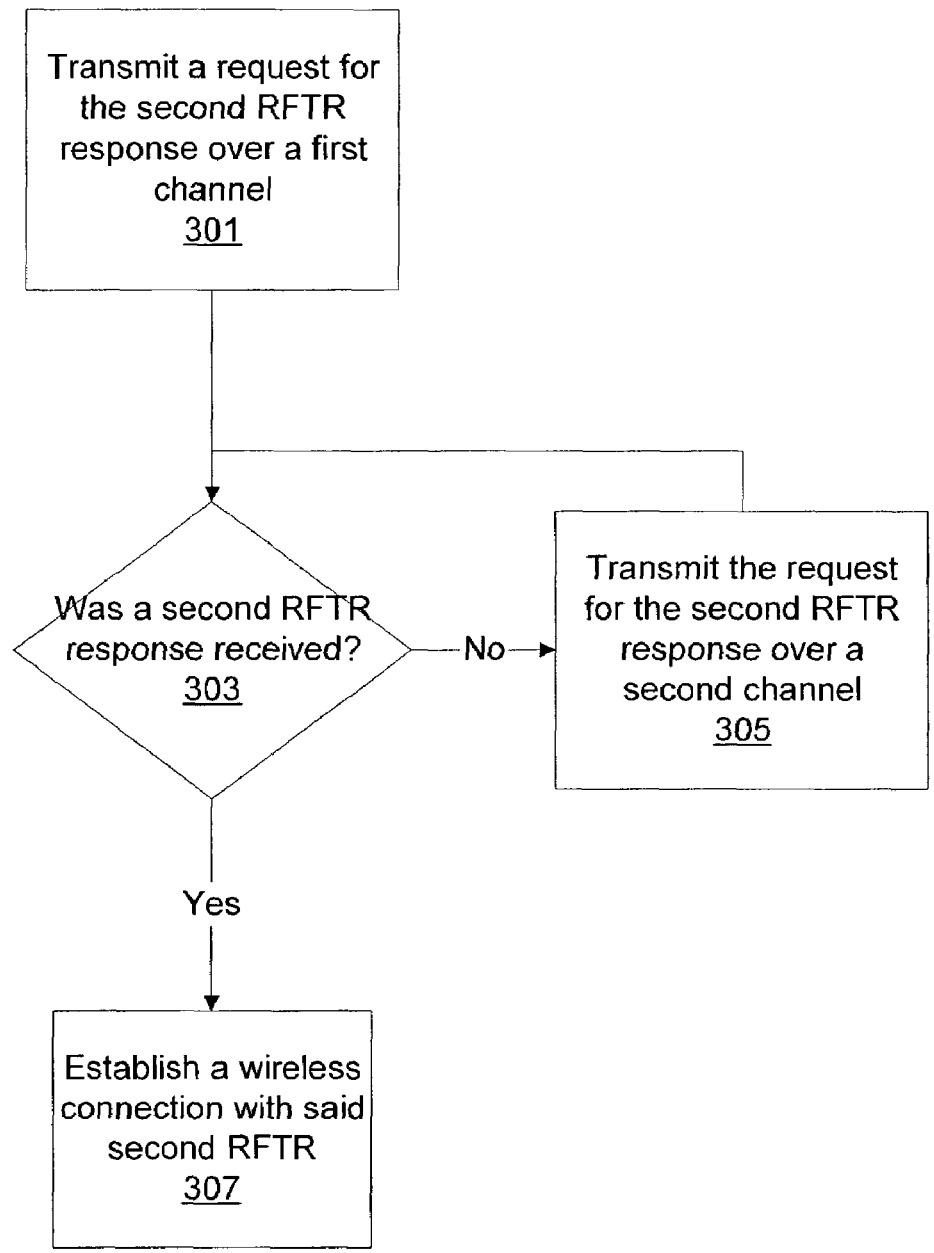
FIG. 3 illustrates a flowchart of a method for discovering an RF peripheral device, according to one embodiment.

FIG. 3: Flowchart for Discovering an RF Peripheral Device

FIG. 3 is a flowchart of an embodiment of a method for discovering an RF peripheral device. It should be noted that in various embodiments of the methods described below, one or more of the steps described may be performed concurrently, in a different order than shown, or may be omitted entirely. Other additional steps may also be performed as desired.

In 301, the first RFTR may transmit a request for the second RFTR to respond over a first channel. For example, the first RFTR may transmit a request for all unassociated RF peripheral devices to respond (e.g., RF peripheral devices currently being used with another computer may not respond) over the first channel. In one embodiment, the first RFTR may send a request for specific RF peripheral devices to respond. For example, the first RFTR transmit a request that all unassociated RF keyboards respond. The first RFTR may then transmit a request that all unassociated computer mouses respond. Other devices and requests are also contemplated.

In 303, a micro-controller may determine if a response from the second RFTR was received.

In 305, if the response from the second RFTR was not received over the first channel, the first RFTR may transmit the request for the second RFTR to respond over a second channel. The method may then continue at 303 until a second RFTR response is received. In one embodiment, the second RFTR may also tune into one channel after another until a connection is established. In one embodiment, the second RFTR may tune into clear and inactive channels or may tune into a pre-determined startup channel. Other channels are also contemplated.

In one embodiment, the first RFTR may send proxy signals to the computer at start-up to represent standard peripheral devices, such as, but not limited to, a computer mouse and a keyboard, regardless of whether the RF peripheral devices have actually been discovered yet. In one embodiment, the computer may be expecting the existence of standard peripheral devices before the micro-controller has actually located the standard peripheral devices. The second RFTR may continue the process at 303 until the standard peripheral devices have been discovered. Sending proxy signals for other RF peripheral devices are also contemplated.

In 307, if the response is received from the second RFTR, a wireless connection may be established between the first RFTR and the second RFTR. In one embodiment, if an RF peripheral device responds through the second RFTR, the computer may form associations with the responding RF peripheral device, assign the RF peripheral device an address, and enumerate the capabilities of the RF peripheral device. For example, the RF peripheral device may be assigned a device identification (ID) and have a host ID transmitted to it. The RF peripheral device may then become part of a "pico-net" of associated RF peripheral devices and the computer. Other actions by the computer corresponding to the RF peripheral device response are also contemplated.

In one embodiment, as the RF peripheral device communicates with the computer and vice-versa, the device ID and the host ID may be used by the RF peripheral device and the computer respectively. The computer may only respond to RF peripheral device communications that contain the device ID. Similarly, in one embodiment, the RF peripheral device may only respond to communications from the computer that contains the host ID. In another embodiment, communications between the device may use the ID of the device or computer being communicated with. For example, the RF peripheral device may only respond to communications that contain the RF peripheral devices ID, and the computer may only respond to communications that contain the host ID. In one embodiment, the RF peripheral device and the computer may communicate in a polled fashion. For example, the computer may transmit data to or request data from the RF peripheral device.

In one embodiment, if multiple RF peripheral devices of a similar type respond, the computer may instruct a user to use the particular RF peripheral device he/she intends to use. For example, if multiple RF keyboards respond, the computer may instruct the user to strike any key on the RF keyboard the user intends to use. The computer may then be able to establish communications with the RF peripheral device that sends input at the time of the request for the user to use the RF peripheral device. Other methods of identifying the correct RF peripheral device to connect to are also within the scope of the invention.

In one embodiment, because communication with the RF peripheral devices may be intermittent, the micro-controllers for the computer and the RF peripheral device may need to maximize data transmission efficiency. For example, the micro-controllers may minimize overhead (i.e., standard information used to identify transmitted information) in high level protocol of communication data payloads (i.e., containing the information to transmit) used to communicate. The micro-controllers may also minimize overhead of the packet definitions used for information transmitted by the RF peripheral devices. For example, a minimized command (CMD) packet, a minimized OUT packet, a minimized datagram (DGM) packet, and a minimized data (DAT) packet may use a header block, a payload block, and cyclic redundancy code (CRC). A minimized IN packet, a minimized acknowledgement (ACK) packet, a minimized negative acknowledgement (NAK) packet, and a minimized error (ERR) packet may use a header block and CRC. In one embodiment, the header may include blocks including, but not limited to, a three bit packet identifier (Pid) block, a three bit human interface device (HID) address block, a two bit endpoint address (Ndp) block, a one bit sequence toggle (Seq) block, a one bit end of transfer (Eot) block, a four bit payload length (Len) block, and a two bit reserved (Rsrv) block. In one embodiment, the payload may include, but is not limited to, eight bit payload data byte blocks. In one embodiment, the payload may include up to 16 payload data byte blocks. Other payloads, blocks, and block sizes are also contemplated.

Figure 4:
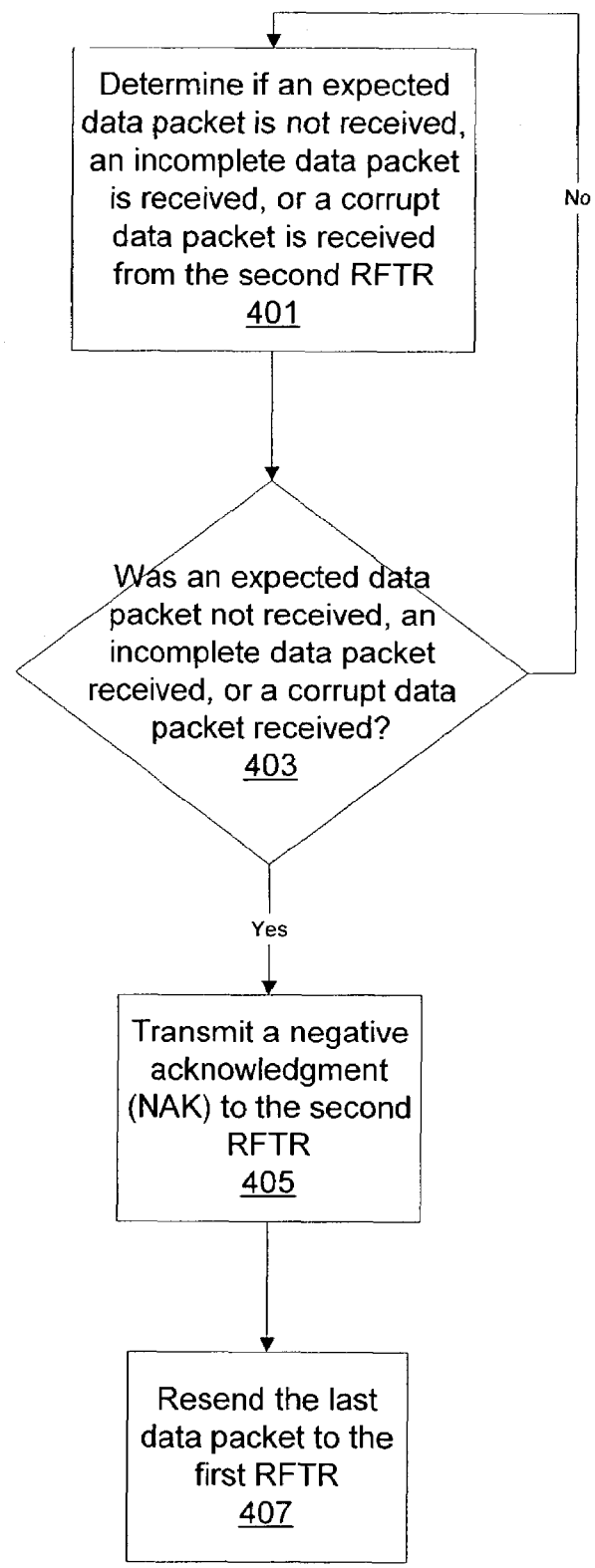
FIG. 4 illustrates a flowchart of a method for managing interruptions in communication with an RF peripheral device, according to one embodiment.

FIG. 4: Flowchart for Managing Interruptions in Communication with an RF Peripheral Device FIG. 4 illustrates a flowchart of an embodiment of a method for managing interruptions in communication with an RF peripheral device. It should be noted that in various embodiments of the methods described below, one or more of the steps described may be performed concurrently, in a different order than shown, or may be omitted entirely. Other additional steps may also be performed as desired.

In 401 and 403, the micro-controller may determine if an expected data packet (i.e., a communication from the second RFTR) is not received, an incomplete data packet is received, or a corrupt data packet is received from the second RFTR. For example, interference on a channel used by the first RFTR and the second RFTR to communicate may occasionally interrupt a data packet sent between the first RFTR and the second RFTR. In 403, if no interruption in communication is detected, the micro-controller may continue displaying at 401.

In 405, the first RFTR coupled to the computer may transmit a negative acknowledgment (NAK) to the second RFTR to indicate that the second RFTR needs to resend the last data packet. In one embodiment, the first RFTR may transmit a request to the second RFTR to have the RF peripheral device resend the last data packet. Other methods of indicating to the second RFTR to resend the last data packet are also contemplated.

In 407, the second RFTR may resend the last data packet to the first RFTR. In one embodiment, the first RFTR may send proxy signals to the computer while waiting for the data packet to be resent by the second RFTR. Other uses of proxy signals are also contemplated. Because the computer may receive proxy signals at start-up and may receive proxy signals when communications with the second RFTR are interrupted, the computer may not be aware of interruptions in communications. In other words, the computer may not require additional software to use the RF peripheral devices.

Figure 5:
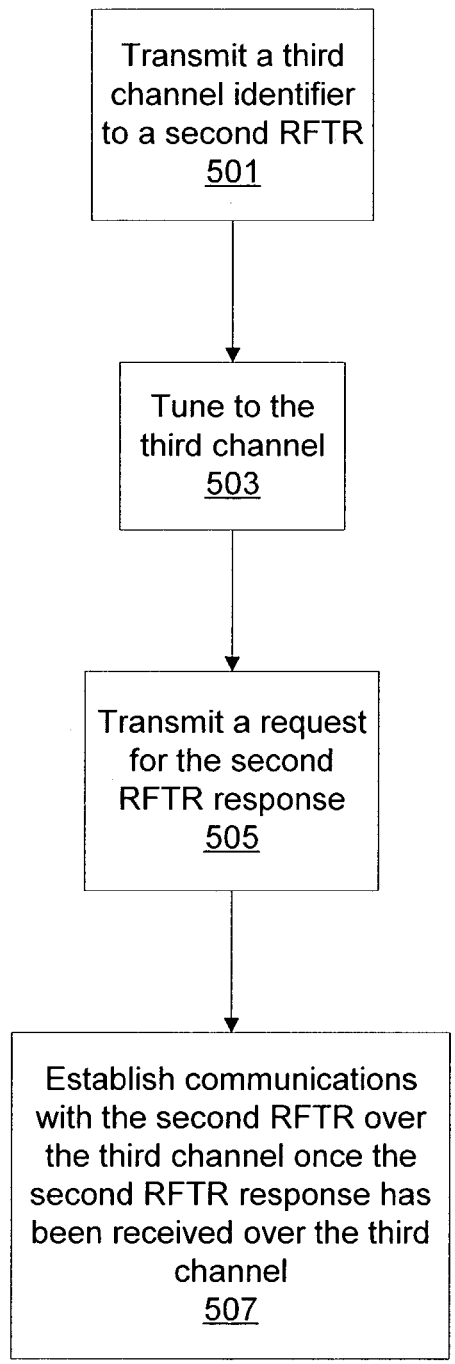
FIG. 5 illustrates a flowchart of a method for reestablishing a connection with an RF peripheral device, according to one embodiment.

FIG. 5: Flowchart for Reestablishing Communications with an RF Peripheral Device FIG. 5 illustrates a flowchart of an embodiment of a method for reestablishing communications with an RF peripheral device. It should be noted that in various embodiments of the methods described below, one or more of the steps described may be performed concurrently, in a different order than shown, or may be omitted entirely. Other additional steps may also be performed as desired.

In 501, a first RFTR may transmit a third channel location to the second RFTR. In one embodiment, the second RFTR may have a pre-determined channel location in memory to tune into in case communications with the first RFTR is discontinued on a current channel. For example, if the current channel being used by the first RFTR and the second RFTR becomes jammed (e.g., becomes active with other communications) for an extended period of time, the second RFTR may go to a pre-determined channel and wait for instructions or a third channel location from the first RFTR. In one embodiment, the first RFTR may transmit a channel for the second RFTR to tune into to wait for further instructions. Other instructions for the second RFTR are also contemplated. In one embodiment, the first RFTR may continue to tune into different channels until a clear and relatively inactive channel is found. In one embodiment, when the first RFTR finds a usable channel, the first RFTR may return to the pre-determined channel and transmit the third channel location (i.e., the usable channel location). In one embodiment, the first RFTR may not be able to find a clear channel. The first RFTR may have to determine the best channel available. In one embodiment, the first RFTR may only pick a channel that is clearer/more inactive than the previous channel the first RFTR was using.

In 503, the first RFTR may tune into the third channel.

In 505, the first RFTR may transmit a request for the second RFTR to respond over the third channel to insure that the second RFTR made a transition from using the predetermined channel to the third channel.

In 507, communications may be established with the second RFTR over the third channel once the second RFTR response has been received over the third channel. In one embodiment, communications may be established with the second RFTR without requesting that the second RFTR respond on the third channel. In one embodiment, a micro-controller coupled to the first RFTR may send proxy signals to the computer to represent the RF peripheral device until communications with the RF peripheral device can be reestablished. In one embodiment, the first RFTR may assume that the second RFTR tuned into the third channel until the first RFTR gets an indication that the second RFTR did not tune into the third channel (e.g., a lack of response from the second RFTR).

Figure 6:
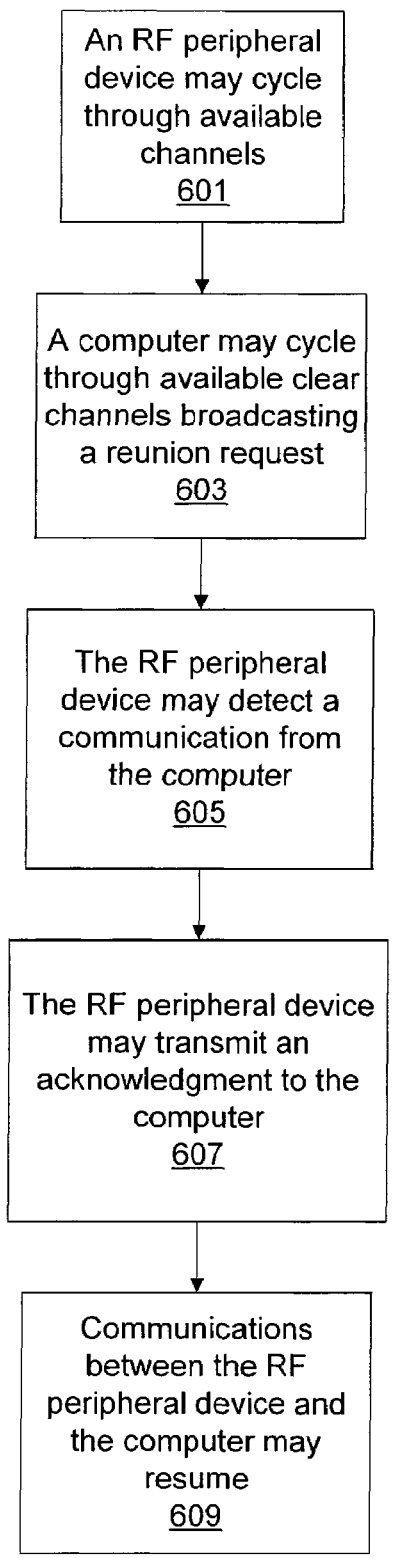
FIG. 6 illustrates a flowchart of a method for reestablishing communications with an RF peripheral device, according to one embodiment.

FIG. 6: Alternate Flowchart for Reestablishing Communications with an RF Peripheral Device FIG. 6 illustrates an alternate flowchart of an embodiment of a method for reestablishing communications with an RF peripheral device. It should be noted that in various embodiments of the methods described below, one or more of the steps described may be performed concurrently, in a different order than shown, or may be omitted entirely. Other additional steps may also be performed as desired.

In 601, an RF peripheral device may cycle through available channels. In one embodiment, the RF peripheral device may sequence through available channels trying to detect communications from the computer. For example, the RF peripheral device and the computer may be able to communicate over eight available channels. In one embodiment, the RF peripheral device may only be able to communicate over fewer available channels. In one embodiment, the RF peripheral device may recognize communications from the computer because of a host ID in the communications (e.g., a host ID in a packet header).

In 603, a computer may cycle through available clear channels broadcasting a reunion request. In one embodiment the computer may cycle through available clear channels at substantially the same time as the RF peripheral device sequences through available channels.

In 605, the RF peripheral device may detect a communication from the computer. For example, the RF peripheral device may detect a communication with a host ID. In one embodiment, the communication from the computer may be the broadcast reunion request.

In 607, the RF peripheral device may transmit an acknowledgment to the computer.

In 609, communications between the RF peripheral device and the computer may resume.

Other embodiments of reestablishing communication are also contemplated. For example, the second RFTR may search for a new channel (i.e., third channel) to use and transmit the new channel location to the first RFTR when the new channel has been found. In one embodiment, the micro-controllers for the RF peripheral device and the computer may be programmed to scan available channels in a particular order. For example, the micro-controllers may switch to a fourth channel for a pre-determined time period and attempt to reestablish communications. If unsuccessful in reestablishing communications, the micro-controllers may switch to a fifth channel for a pre-determined time period, and so on.

Various embodiments may further include receiving or storing instructions and/or information implemented in accordance with the foregoing description upon a carrier medium. Suitable carrier media may include storage media or memory media such as magnetic or optical media, e.g., disk or CD-ROM, random access memory or other memory, as well as transmission media or RF signals such as electrical, electromagnetic, or digital RF signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer system, comprising:
a processor;
a first radio frequency transmitter/receiver (RFTR) coupled to the processor;
a peripheral device comprising a second RFTR configured to transmit a radio frequency (RF) signal, wherein the first RFTR and the second RFTR are operable to communicate in a wireless fashion;
a memory coupled to the processor and configured to store program instructions executable to:

transmit a request using the first RFTR for a second RFTR response over a first channel; and transmit the request using the first RFTR for the second RFTR response over a second channel if the second RFTR response is not received by the first RFTR.

2. The computer system of claim 1, wherein the program instructions are further executable to transmit a signal to the processor on computer start-up to represent the peripheral device before the second RFTR response is received by the first RFTR.

3. The computer system of claim 1, wherein the program instructions are further executable to establish a wireless connection with the second RFTR if the second RFTR response is received.

4. The computer system of claim 1, wherein the second RFTR is operable to scan available channels until the second RFTR receives the request for the second RFTR response from the first RFTR.

5. The computer system of claim 1, wherein the peripheral device is a computer mouse, a keyboard, a touchscreen, a gamepad, a joystick, a microphone, or a camera.

6. The computer system of claim 1, wherein the processor is part of a micro-controller coupled to the first RFTR.

7. A computer system, comprising:

a processor;

a first radio frequency transmitter/receiver (RFTR) coupled to the processor;

a peripheral device comprising a second RFTR configured to transmit an RF signal, wherein the first RFTR and the second RFTR are operable to communicate in a wireless fashion;

a memory coupled to the processor and configured to store program instructions executable to:

identify if the first RFTR has not received an expected data packet from the second RFTR, has received a partial data packet from the second RFTR, or has received a corrupt data packet from the second RFTR; and transmit from the second RFTR the expected data packet or an original data packet that was a source of the partial data packet or the corrupt data packet.

8. The computer system of claim 7, wherein the program instructions are further executable to transmit a negative acknowledgement to the second RFTR if the expected data packet is not received from the second RFTR, the partial data packet is received from the second RFTR, or the corrupt data packet is received from the second RFTR.

9. The computer system of claim 7, wherein the program instructions are further executable to transmit a request to the second RFTR to resend the original data packet if the expected data packet is not received from the second RFTR, the partial data packet is received from the second RFTR, or the corrupt data packet is received from the second RFTR.

10. The computer system of claim 7, wherein the first RFTR is operable to send signals to a computer, comprising the processor and the memory, through a Universal Serial Bus (USB) connection without the computer becoming aware of an interruption in RF communication with the peripheral device.

11. The computer system of claim 7, wherein the peripheral device is a computer mouse, a keyboard, a gamepad, a joystick, a microphone, a touchscreen, or a camera.

12. The computer system of claim 7, wherein the processor is part of a micro-controller coupled to the first RFTR.

13. A method, comprising:

transmitting a request for a second radio frequency transmitter/receiver (RFTR) response over a first channel;

transmitting the request for the second RFTR response over a second channel if the second RFTR response is not received;

establishing a wireless connection between a first RFTR and a second RFTR, coupled to a peripheral device, if the second RFTR response is received; and transmitting a signal to a processor on computer start-up to represent the peripheral device before the second RFTR response is received by the first RFTR.

14. The method of claim 13, further comprising:

scanning available channels by the second RFTR until the second RFTR receives the request for the second RFTR response.

15. A computer readable memory medium comprising program instructions, wherein the program instructions are computer executable to:

transmit a request using a first radio frequency transmitter/receiver (RFTR) for a second RFTR response over a first channel, wherein the first RFTR is coupled to a processor, wherein a peripheral device comprises the second RFTR, and wherein the first RFTR and the second RFTR are operable to communicate in a wireless fashion;

transmit the request using the first RFTR for the second RFTR response over a second channel if the second RFTR response is not received by the first RFTR; and transmit a signal to the processor on computer start-up to represent the peripheral device before the second RFTR response is received by the first RFTR.

16. The computer readable memory medium of claim 15, wherein the program instructions are further executable to establish a wireless connection with the second RFTR if the second RFTR response is received.

17. The computer readable memory medium of claim 15, wherein the second RFTR is operable to scan available channels until the second RFTR receives the request for the second RFTR response from the first RFTR.

18. The computer readable memory medium of claim 15, wherein the peripheral device is a computer mouse, a keyboard, a touchscreen, a gamepad, a joystick, a microphone, or a camera.

19. A computer readable memory medium comprising program instructions, wherein the program instructions are computer executable to:

identify if a first radio frequency transmitter/receiver (RFTR) has not received an expected data packet from a second RFTR, has received a partial data packet from the second RFTR, or has received a corrupt data packet from the second RFTR, wherein the first RFTR is coupled to a processor, wherein the second RFTR is coupled to a peripheral device, and wherein the first RFTR and the second RFTR are operable to communicate in a wireless fashion; and transmit from the second RFTR the expected data packet or an original data packet that was a source of the partial data packet or the corrupt data packet.

20. The computer readable memory medium of claim 19, wherein the program instructions are further executable to transmit a negative acknowledgement to the second RFTR if the expected data packet is not received from the second RFTR, the partial data packet is received from the second RFTR, or the corrupt data packet is received from the second RFTR.

21. The computer readable memory medium of claim 19, wherein the program instructions are further executable to transmit a request to the second RFTR to resend the original data packet if the expected data packet is not received from the second RFTR, the partial data packet is received from the second RFTR, or the corrupt data packet is received from the second RFTR.

22. The computer readable memory medium of claim 19, wherein the first RFTR is operable to send signals to a computer, comprising the processor and a memory, through a Universal Serial Bus (USB) connection without the computer becoming aware of an interruption in RF communication with the peripheral device.

23. The computer readable memory medium of claim 19, wherein the peripheral device is a computer mouse, a keyboard, a gamepad, a joystick, a microphone, a touchscreen, or a camera.

24. A computer readable memory medium comprising program instructions, wherein the program instructions are computer executable to:
   transmit a request for a second radio frequency transmitter/receiver (RFTR) response over a first channel;
   transmit the request for the second RFTR response over a second channel if the second RFTR response is not received;
   establish a wireless connection between a first RFTR and a second RFTR, coupled to a peripheral device, if the second RFTR response is received; and
   transmit a signal to a processor on computer staff-up to represent the peripheral device before the second RFTR response is received by the first RFTR.

25. The computer readable memory medium of claim 24, wherein the program instructions are further executable to scan available channels by the second RFTR until the second RFTR receives the request for the second RFTR response.

* * * * *